UNITED STATES PATENT OFFICE.

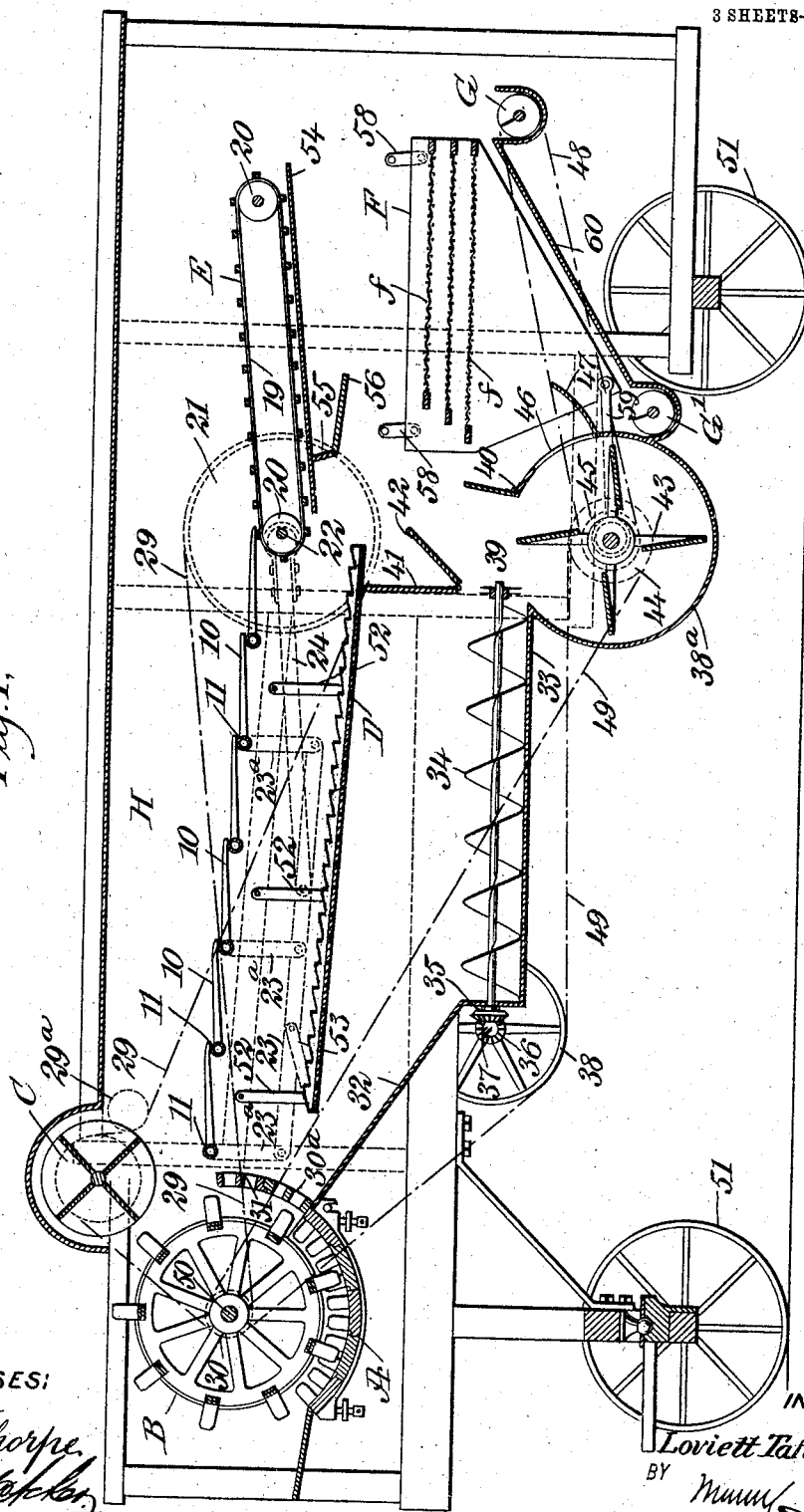

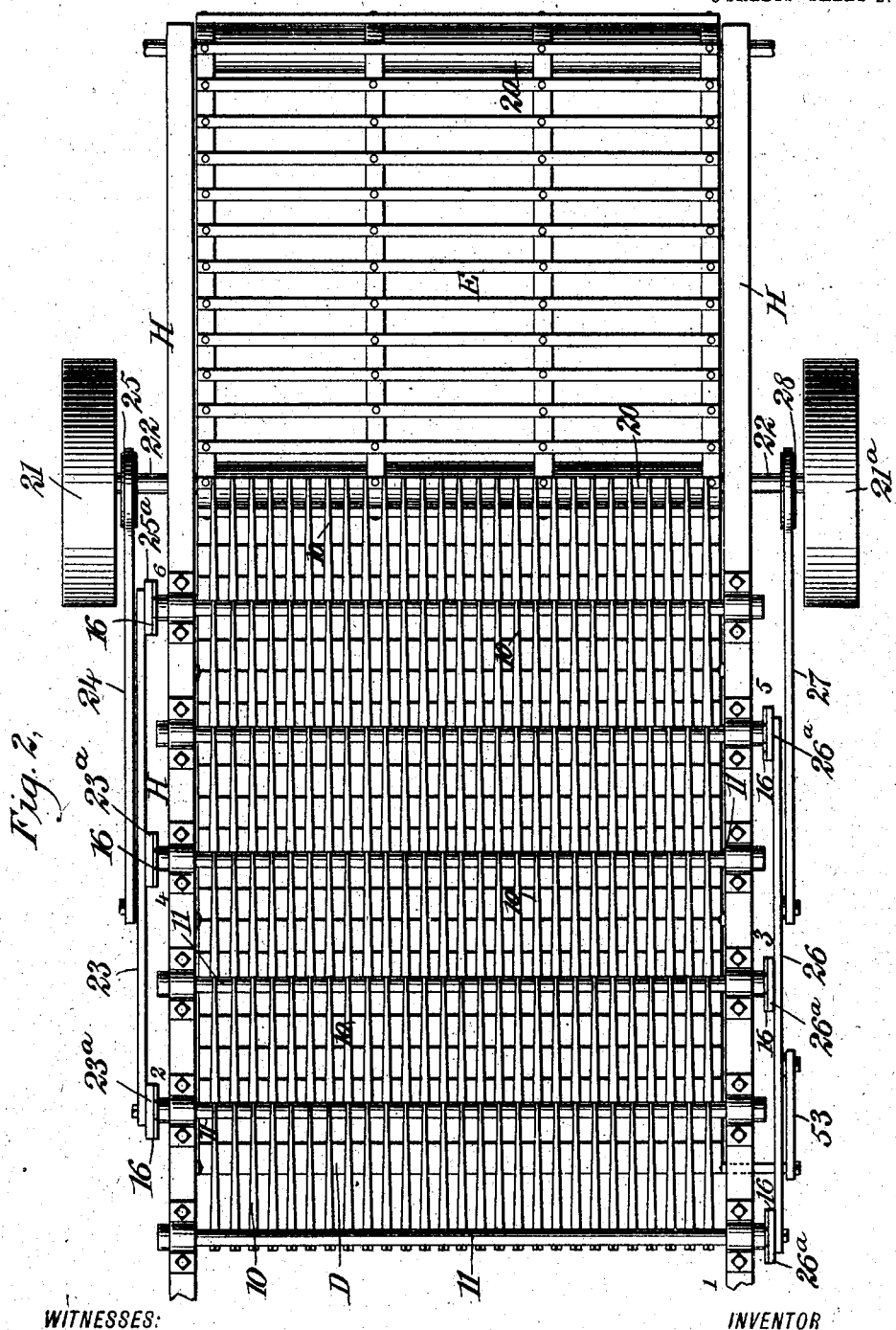

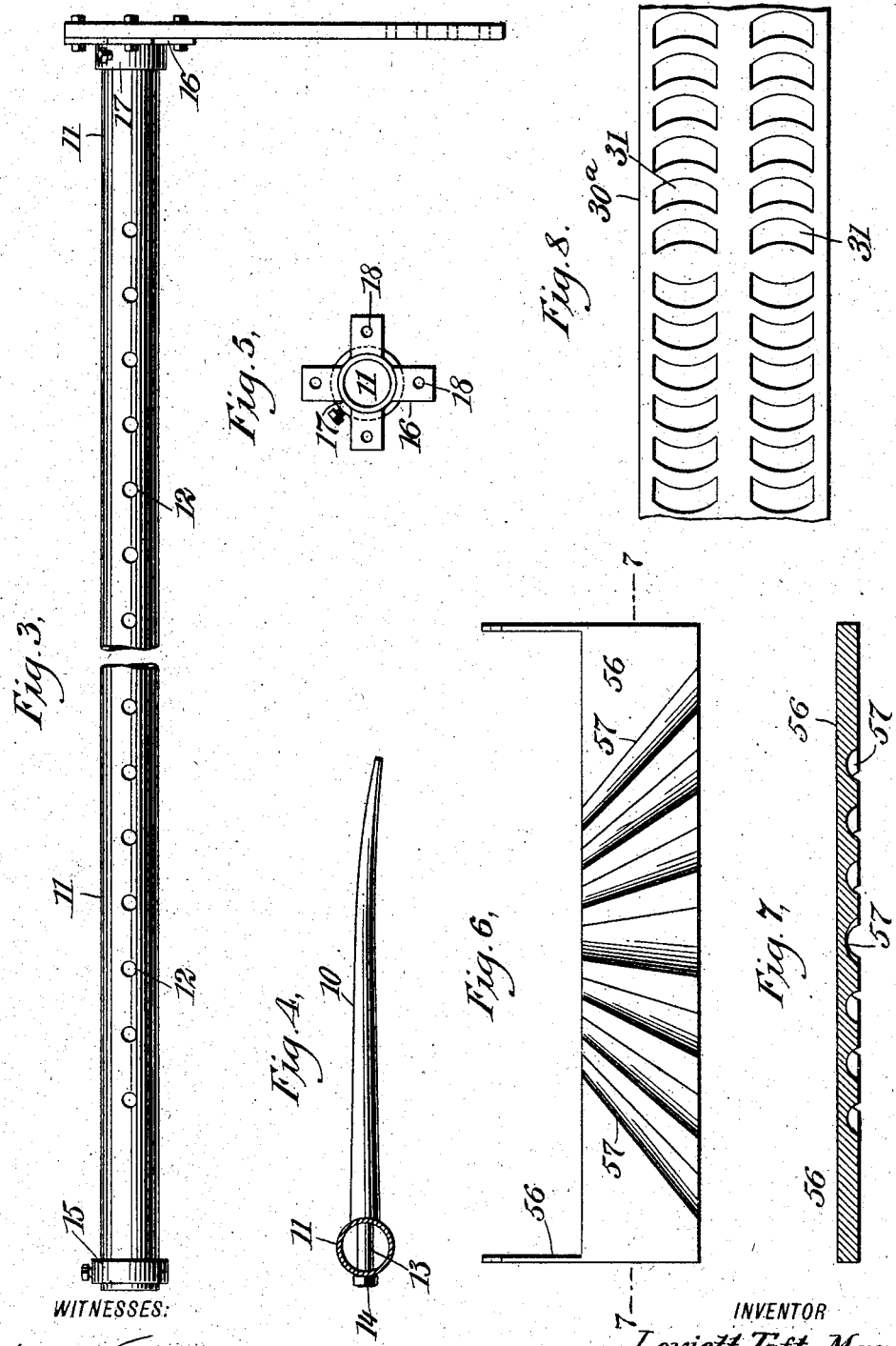

LOVIETT TAFT MANN, OF MOLINE, KANSAS.

GRAIN-SEPARATOR.

No. 796,233. Specification of Letters Patent. Patented Aug. 1, 1905.

Application filed September 20, 1904. Serial No. 225,212.

*To all whom it may concern:*

Be it known that I, LOVIETT TAFT MANN, a citizen of the United States, and a resident of Moline, in the county of Elk and State of Kansas, have invented a new and Improved Grain-Separator, of which the following is a full, clear, and exact description.

My invention relates to the grain-separating elements of a threshing-machine; and the purpose of the invention is to provide a series of lifting-fingers over the chaffer having reciprocating movement in a vertical direction and means for conducting the straw and grain from the concave and cylinder onto the said fingers, the rearmost of which fingers deposit the threshed straw upon the raddle, which in its turn conducts the straw to the delivery end of the thresher.

A further purpose of the invention is to provide the concave with an extension-grate leading from the concave to the lifting-fingers, through which grate the grain loosened in the concave finds passage to a conveyer, and also to provide a blast-regulating board beneath the chaffer opposite the front of the shoe and a fan having three delivery-openings in its casing—one leading to the delivery end of the conveyer, another in direction of the top of the shoe, and the other into the shoe below the riddles, so as to conduct the grain from the conveyer and the grain delivered from the chaffer to the riddles and clear the grain of chaff and at the same time further clear the grain from foreign material while on the riddles.

Another purpose of the invention is to provide a drift-board over the forward end of the shoe, against which all the grain is blown before being deposited upon the riddles, said board having diverging grooves upon its under face, so as to spread the grain as it leaves the board.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical longitudinal section through a threshing-machine having my improvement applied. Fig. 2 is a plan view of the rear portion of the machine, the top having been removed. Fig. 3 is a plan view of the shaft fitted to receive a series of lifting-fingers. Fig. 4 is a transverse section through a lifting-shaft and a side elevation of a finger secured thereto. Fig. 5 is an end view of the lifting-shaft. Fig. 6 is a bottom plan view of the drift-board. Fig. 7 is a section through the drift-board, taken practically on the line 7.7 of Fig. 6; and Fig. 8 is a front elevation of the grate adapted as an addition to the concave.

A represents the concave of a threshing-machine; B, the cylinder; C, the beater, which operates adjacent to the cylinder; E, the raddle, which conducts the straw from the machine, and F is the shoe.

$f$ designates the riddles contained in the shoe.

G represents the grain-auger which receives the material from the lowermost riddle and which is too coarse to pass through the same, and $G'$ designates the second auger, which receives the fine material which is passed through the riddles.

H represents the sides of the framing or casing of the threshing-machine.

A particular feature of the invention consists in the construction of a series of fingers adapted to shake the straw and separate the grain therefrom while the straw is passing over the chaffer D, which is of the ordinary construction—namely, being provided with an open-work or sieve bottom. This separating medium consists of a series of transversely-arranged fingers 10, the said fingers being carried by shafts 11, preferably tubular, as shown in Figs. 1 and 3, the said shafts 11 being journaled in suitable bearings in the frame or casing of the machine, as is illustrated in Fig. 2. These shafts 11 are arranged at predetermined intervals apart, the distance between the shafts being preferably equal, and each "lifting-shaft" 11, as the shafts may be termed, is provided with apertures 12, extending through from side to side, as is shown in Fig. 3. The fingers 10, which are slightly curved in a downward direction at their free ends, at their heel portions are provided with shanks 13, which shanks are passed through the apertures 12 in the lifting-shafts 11 and are held in position by nuts 14, as is clearly illustrated in Fig. 4. Each lifting-shaft 11 is provided at one end with a collar 15, attached thereto by a set-screw or the equivalent of the same, and at the opposite end of each lifting-shaft 11 a spider or stellated attaching member 16 is secured, usually through the medium of a collar 17, forming a portion of the said stellated or spider member, which collar is either directly secured to the shaft or is detachably connected to it by means of a set-screw or like device, as is clearly shown in Figs. 3 and 5. Furthermore, each member of the spider or stellated attaching member for a lifting-shaft is provided with apertures 18 to facilitate its attachment to an operating device to be hereinafter described. The raddle E is of the usual construction, comprising an endless slatted belt 19, which passes over drums 20, suitably mounted in the sides H of the casing of the machine, and the shaft 22, on which the forward drum 20 is secured, extends some distance beyond the sides of the casing, as is shown in Fig. 3, and at the left-hand end of this raddle-shaft 22 a pulley 21 is secured, while at the right-hand end of the same shaft a pulley $21^a$ is fastened. Links $23^a$ extend downward from the lifting-shafts 11, as is indicated by dotted lines in Fig. 1, the links at the right-hand side of the casing extending from the first, third, and fifth lifting-shaft at the outside of the casing, while the links at the opposite or left-hand side of the casing extend downward from the second, fourth, and sixth lifting-shaft, as the said fingers 10 are adapted to have vertical movement upward and downward and are driven by the two pulleys 21 and $21^a$ at the ends of the raddle-shaft 22. It may here be remarked that the fingers of one series in their normal position extend over the shaft carrying the fingers of the next series and that the fingers on the rear lifting-shaft 11 extend over the receiving end of the raddle E, as is shown in Fig. 1.

The links $23^a$, at the left-hand side of the machine, are connected by a bar 23, and to this connecting-bar, at or near its center, the forward end of a pitman 24 is pivoted, the rear end of the said pitman terminating in a strap which is made to embrace the periphery of an eccentric 25 on the left-hand end portion of the raddle-shaft 22. The links extending down from the first, third, and fifth lifting-shafts 11 at the right of the casing are connected by a bar 26, corresponding to the bar 23, just mentioned, and at or near the center of the said bar 26 a pitman 27 is pivotally attached, which pitman is of the same construction as the pitman 24 at the opposite side of the machine, terminating at its rear end in a strap which peripherally engages with an eccentric 28 on the raddle-shaft 22. The right-hand links for the shafts of the lifting-fingers are shown in Fig. 2 and are therein designated as $26^a$. The lifting-shafts 11 are attached to the links $23^a$ and $26^a$ through the medium of the stellated or spider attaching members 16, carried by the said shaft, as is clearly shown in Fig. 2.

With reference to the driving mechanism for the raddle and for the lifting-fingers at the left-hand side of the machine, a cross-belt 29 is employed, which is passed over the pulley 21 and over a pulley which is on the shaft of the beater C and then over a suitable pulley 30 on the shaft 50 of the cylinder B, as is shown by broken lines in Fig. 1, and the upper stretch of this belt 29 is held in engagement with the aforesaid pulley on the beater-shaft by means of a suitably-placed idler $29^a$. A duplicate belt is located at the right-hand side of the machine, being carried over the right-hand pulley $21^a$ and over a suitable pulley at the right-hand end of the cylinder-shaft 50.

I employ an extension of the concave A, which extension is in the form of a grate $30^a$, having a curvature corresponding to that of the said concave, the grate being shown in position in Fig. 1 and in detail in Fig. 8. This grate is provided with a series of apertures 31, (shown clearly in the two figures above mentioned,) and where the grate $30^a$ connects with the concave A a downwardly and rearwardly inclined conducting-floor 32 is formed, which leads to what may be termed a "horizontal" pocket 33, in the end walls of which pocket the shaft of a conveyer 34 is mounted to turn, the said conveyer 34 being preferably of a screw type, and at the forward end of the shaft of the conveyer 34, outside of the pocket 33, a bevel-gear 35 is secured, which meshes with a bevel-gear 36 on a shaft 37, mounted in suitable bearings on the bottom portion of the frame or casing of the machine, and this shaft 37 carries a pulley 38, as is shown in Fig. 1.

At the delivery end of the pocket 33, in which the conveyer 34 has movement, a fan-casing $38^a$ is located, extending down below the bottom portion of the casing of the machine. This fan-casing $38^a$ is provided with an opening 39 at its top, which opening communicates with the delivery end of the pocket 33 and is likewise directed to the space below the raddle E, as is shown in Fig. 1. At the rear end of this opening 39 an adjustable guard 40 is attached to the said casing, so as to insure the air being directed in the manner which has been described. Above the upper portion of the pocket 33, at its delivery end and below the chaffer D, a vertical partition 41 is located in the casing, as is shown in Fig. 1, and at the lower end of this partition 41 a blast-regulating board 42 is adjustably placed, being preferably hinged to the partition 41, so that the said blast-regulating board may be changed with relation to the guard 40 in order to more or less concentrate the air which is forced through the fan-casing $38^a$ upward. A fan 43, of any suitable construction, is located in the casing $38^a$, and at one end of the fan-shaft outside of the casing two pulleys 44 and 45 are secured. In the said fan-casing at its rear upper portion an opening 46 is provided, which is in direct communication with the shoe F at a point below the riddles $f$, and the door 47 for this opening 46 when in the open position (shown in Fig. 1) serves to direct the air passing through the said opening 46 in the fan-casing to the said riddles $f$.

The grain-auger G is driven by a belt 48, which passes over the pulley 45 on the fan-shaft, and the auger G' can be driven by the same belt or by a duplicate of the belt 48, located at the opposite side of the machine; but I desire it to be understood that I do not confine myself to the particular arrangement of the driving-belts and mechanism. In the further illustration of the application of the driving-belts the fan-shaft is driven by a belt 49, which passes over the pulley 44 on the fan-shaft, which belt is a cross-belt and engages with the pulley 38 on the drive-shaft 36 for the conveyer 34 and is then passed upward and forward over a suitable pulley on the shaft 50 of the cylinder. The frame or casing of the machine is supported on suitable forward and rear wheels 51, as is shown in Fig. 1.

With reference to the chaffer, it is suspended in the usual manner by links 52, pivoted to the casing at the inside thereof, and pins extend out through the casing at the forward end of the chaffer. Links 53 are pivotally connected with these pins and with the connecting-bars 23 and 26, so that as the said connecting-bars are operated a corresponding motion is imparted to the chaffer.

Just below the raddle E a flooring 54 is located, and from the forward portion of this flooring a downward extension 55 is provided, to which extension a drift-board 56 is hinged. This drift-board, which is shown in detail in Figs. 6 and 7, is adapted to receive the grain, and as the grain impinges on this drift-board the said board tends to scatter the grain over the uppermost riddle. As is particularly shown in Figs. 6 and 7, this is accomplished by producing a series of grooves 57 in the under face of the board, which are inclined in opposite directions at each side of the center of the board from the front end in direction of the rear end, so that as the grain strikes the board and enters the said grooves the mass of grain is separated and distributed as equally as possible over the upper riddle $f$. The shoe F is suspended by links 58, as shown in Fig. 1.

In the operation of the machine the straw is fed to the concave and cylinder in the ordinary manner, but is conducted up onto the threshing-fingers 10, which as they move upward and downward tend to separate the grain from the straw and drop the grain onto the chaffer D, which in its turn delivers the grain to the space above the opening 39 in the fan-casing, where it is subjected to the action of the air from the fan and is driven against the drift-board to be scattered on the riddle. As the straw is passing out from the concave it necessarily passes over the grate $30^a$, and any grain which may have been liberated by the action of the cylinder on the concave will pass out through the openings 31 in the grate down the inclined floor 32 to the conveyer 34, and as the grain reaches the outlet of the pocket 33, in which this conveyer operates, the suction created by the fan at the outlet of the pocket will draw the grain over the opening 39 at the upper portion of the fan-casing, and the blast of air from the fan will direct the grain to the drift-board, where it will also be directed in turn to the riddles. Thus it will be observed that the straw is thoroughly threshed, not only being acted upon by the concave and cylinder, but being also subsequently agitated by the lifting-fingers. The straw after having been thoroughly threshed is conducted out of the machine by the raddle E. It will be further observed that the grain loosened between the concave and cylinder is not lost and does not tend to clog the action of the cylinder, as said grain escapes through the openings in the grate $30^a$. All of the grain is directed to the riddles, and the grain as it passes to the riddles is freed from chaff and is thoroughly freed from any foreign material which may still remain by means of the blast of air passing up through the riddles.

It may here be mentioned that a bottom 60 is provided for the shoe independent thereof, extending from the casing for the grain-auger G to the casing for the grain-auger G', and that the shoe is preferably agitated by links 59, pivoted to the shoe and pivotally connected with the shaft of the fan.

Having thus described my invention, I claim as new and desire to secure by Letters Patent—

1. In a grain-separator, a conveyer, a shoe, riddles for the shoe, a drift-board which tends to spread the grain and located above the shoe, a fan-casing below the conveyer and adjacent to the shoe, which casing is provided with an opening leading to the conveyer and the drift-board and an opening leading into the shoe below the riddles, means for operating the conveyer, the fan and shoe, a chaffer held to reciprocate above the conveyer, lifting-fingers mounted for vertical reciprocating motion above the chaffer, the said fingers being arranged in overlapping series, a mechanism for simultaneously operating the lifting-fingers and chaffer, a draft-board adjustably located at one side of the opening leading from the fan-casing to the drift-board, a guard at the opposite side of the same opening, and a door for the opening in the casing leading into the shoe, which door when open extends into said shoe.

2. In a threshing-machine, a shoe, a drift-board supported above the shoe, having a series of diverging grooves in its under face, and a fan-casing having an opening directed to said drift-board and an opening in communication with said shoe.

3. In a threshing-machine, the combination with a concave and cylinder, and an inclined grain-receiving board extending downward from the inner end of the concave, a conveyer-casing meeting the said board, and a conveyer within the said casing, of a grate constituting an extension of the upper end of the concave, being located above the grain-receiving board, a chaffer located at the rear of the said grate and above the said grain-receiving board, lifting devices for the straw located above the chaffer, the chaffer being partially over the grain-receiving board and partially over the conveyer, substantially as described.

4. In a threshing-machine, the combination with a concave and cylinder and an inclined grain-receiving board extending downward from the inner end of the concave, a conveyer-casing meeting the said board, and a conveyer within the said casing, of a grate constituting an extension of the upper end of the concave, being located above the grain-receiving board, a chaffer located at the rear of the said grate and above the said grain-receiving board, lifting devices for the straw located above the chaffer, the chaffer being partially over the grain-receiving board and partially over the conveyer, a beater located above the lifting mechanism and adjacent to the cylinder, a raddle in communication with the straw-lifting mechanism, a baffle-board below the raddle, a drift-board adjustably connected with the baffle-board, a riddle, a fan-casing, a fan within the same, the said fan-casing being provided with an opening connecting with the conveyer-casing, an opening connecting with the riddle, and a spout directed to the drift-board, all operating substantially as described.

In testimony whereof I have signed my name to this specification in the presence of two subscribing witnesses.

LOVIETT TAFT MANN.

Witnesses:
RUSSELL WEBB,
JAMES R. GILL.